United States Patent
Lopez Nieto

(10) Patent No.: US 9,225,619 B2
(45) Date of Patent: Dec. 29, 2015

(54) METHOD AND APPARATUSES FOR POLICY DECISIONS ON USAGE MONITORING

(75) Inventor: Ana Maria Lopez Nieto, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 448 days.

(21) Appl. No.: 13/812,622

(22) PCT Filed: Jul. 26, 2010

(86) PCT No.: PCT/IB2010/001999
§ 371 (c)(1),
(2), (4) Date: Jan. 28, 2013

(87) PCT Pub. No.: WO2012/014002
PCT Pub. Date: Feb. 2, 2012

(65) Prior Publication Data
US 2013/0132570 A1    May 23, 2013

(51) Int. Cl.
*G06F 15/173* (2006.01)
*H04L 12/26* (2006.01)
(Continued)

(52) U.S. Cl.
CPC ............ *H04L 43/00* (2013.01); *H04L 41/0893* (2013.01); *H04L 41/5054* (2013.01); *H04M 15/00* (2013.01); *H04M 15/51* (2013.01); *H04M 15/64* (2013.01); *H04M 15/66* (2013.01); *H04M 15/8016* (2013.01); *H04M 15/835* (2013.01); *H04M 15/84* (2013.01); *H04M 15/85* (2013.01);
(Continued)

(58) Field of Classification Search
CPC ..... H04M 15/00; H04M 15/66; H04M 15/84; H04M 15/85

USPC .......................................... 709/217, 224, 232
See application file for complete search history.

(56) References Cited

U.S. PATENT DOCUMENTS 8,640,188 B2 *  1/2014  Riley et al. ...................... 726/1
8,813,168 B2 *  8/2014  Riley et al. ...................... 726/1
(Continued)

FOREIGN PATENT DOCUMENTS

CN        101 730 048        6/2010
WO     WO 2010/060457      6/2010

OTHER PUBLICATIONS

International Search Report for PCT/IB2010/001999 mailed Apr. 5, 2011.
(Continued)

*Primary Examiner* — Phuoc Nguyen
(74) *Attorney, Agent, or Firm* — Baker Botts, LLP

(57) ABSTRACT

The present invention improves control rules requests between reporting periods, and provides for enhanced PCRF and PCEF carrying out a method of controlling usage of network resources. This method comprises: determining at the PCEF events requiring control rules; requesting control rules and providing information about usage of network resources during the reporting period from the PCEF to the PCRF; determining at the PCRF first control rules by using the information about usage of network resources; determining at the PCRF second control rules by using an initial value for usage of network resources during a next reporting period; submitting from the PCRF to the PCEF the first and second control rules; enforcing at the PCEF the first control rules received from the PCRF; and upon starting the next reporting period for the user, inactivating the first control rules and enforcing at the PCEF the second control rules received from the PCRF.

31 Claims, 7 Drawing Sheets

(51) Int. Cl.
*H04L 12/24* (2006.01)
*H04M 15/00* (2006.01)
*H04W 4/24* (2009.01)
*H04W 4/26* (2009.01)

(52) U.S. Cl.
CPC .......... *H04M 15/851* (2013.01); *H04M 15/853* (2013.01); *H04M 15/854* (2013.01); *H04M 15/88* (2013.01); *H04M 15/883* (2013.01); *H04W 4/24* (2013.01); *H04W 4/26* (2013.01); *H04M 2215/0116* (2013.01); *H04M 2215/0128* (2013.01); *H04M 2215/2026* (2013.01); *H04M 2215/54* (2013.01); *H04M 2215/7414* (2013.01); *H04M 2215/8104* (2013.01); *H04M 2215/815* (2013.01); *H04M 2215/8129* (2013.01); *H04M 2215/8162* (2013.01)

(56) References Cited

U.S. PATENT DOCUMENTS 8,874,715 B2 * 10/2014 Zhou et al. .................... 709/223
2008/0232376 A1 * 9/2008 Huang et al. ............... 370/395.3

OTHER PUBLICATIONS

ETSI TS 129 212 V9.1.0; Technical Specification; Universal Mobile Telecommunications System (UMTS); LTE; Policy and charging control over Gx reference point (3GPP TS 29.212 version 9.1.0, Release 9), 109 pages, Jan. 2010.

3GPP TS 23.203 V9.4.0; Technical Specification; 3rd Generation Partnership Project; Technical Specification Group Services and System Aspects; Policy and charging control architecture (Release 9), 123 pages, Mar. 2010.

* cited by examiner

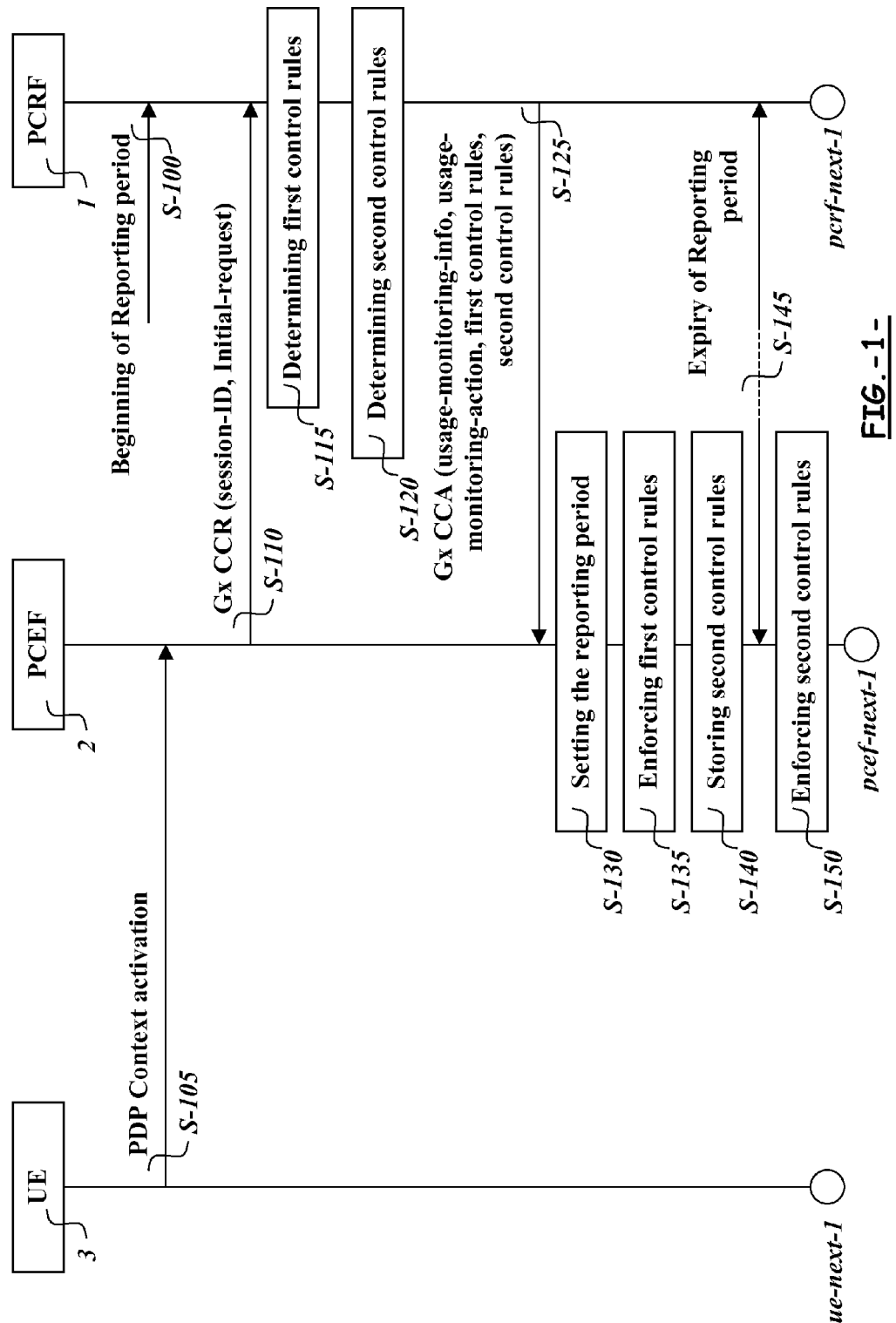
FIG. -1-

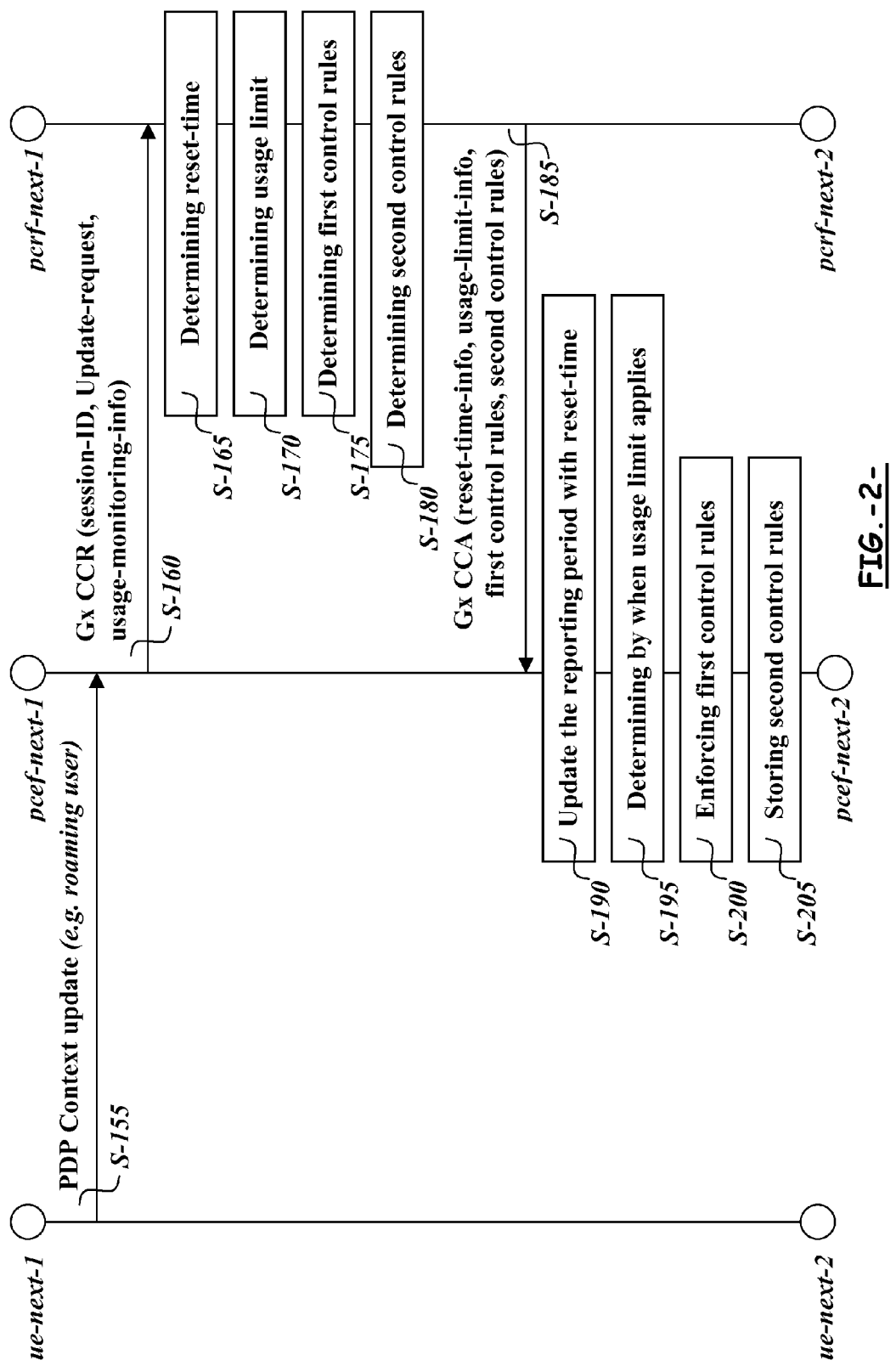
FIG. -2-

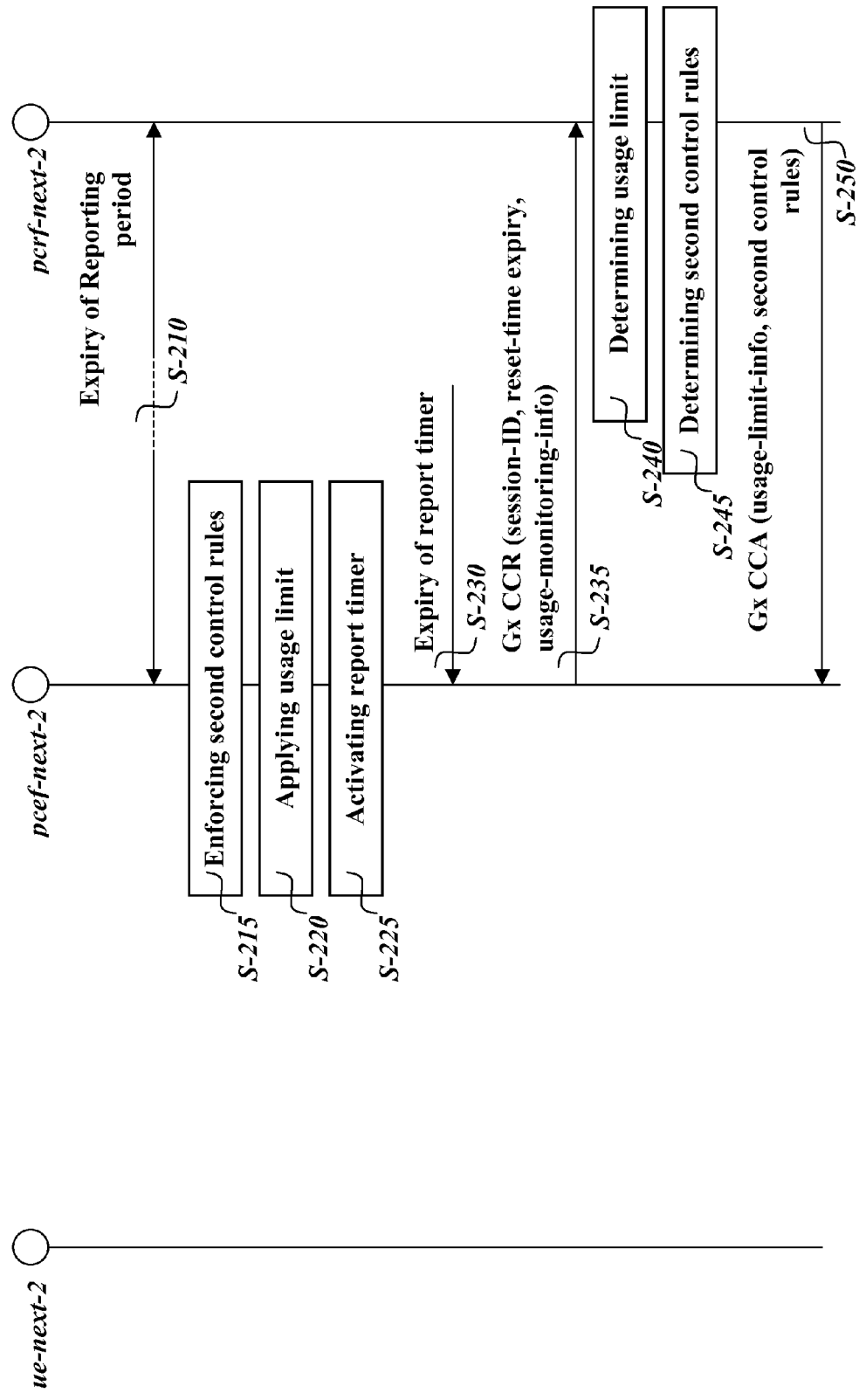
FIG. -3-

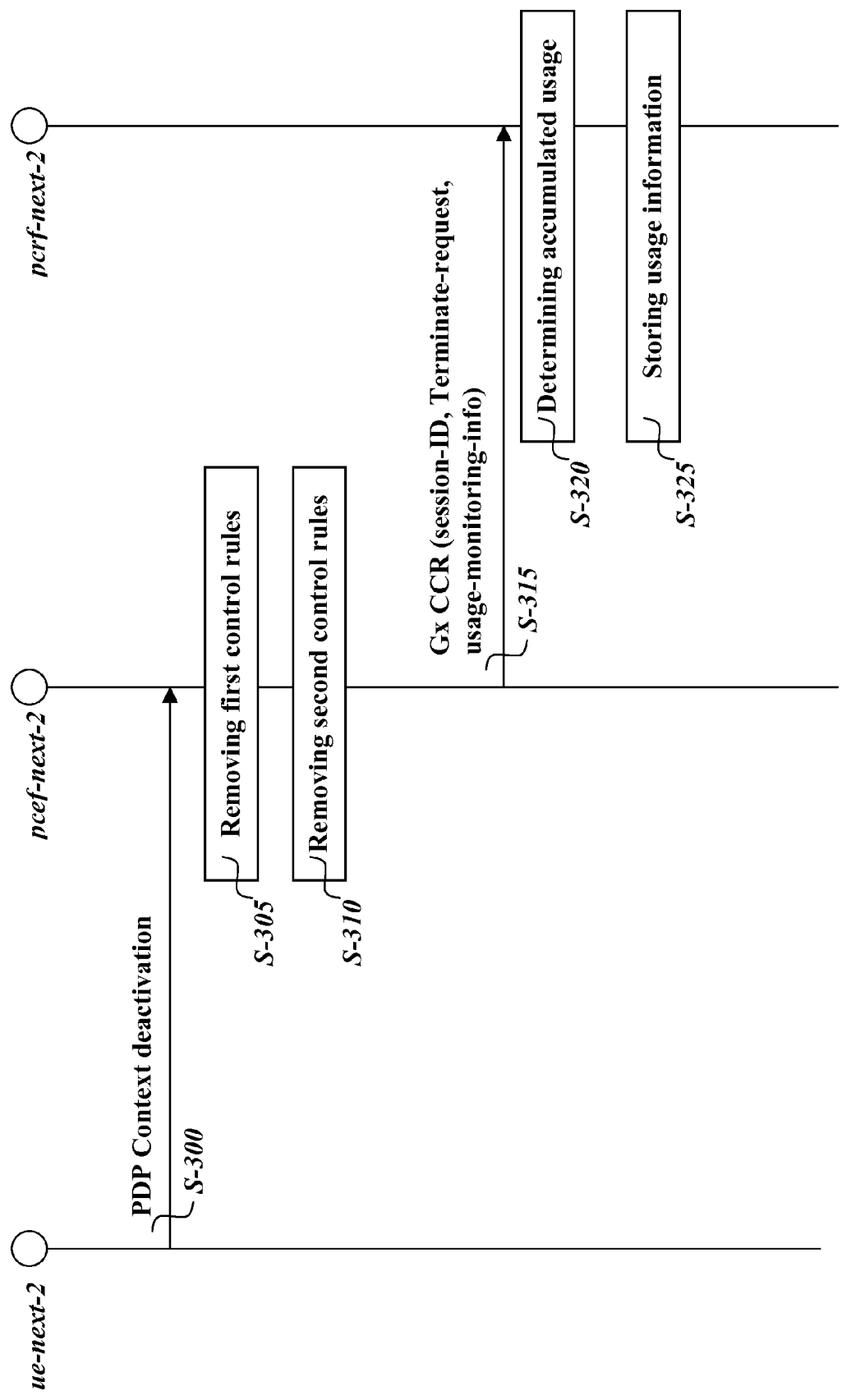
FIG. -4-

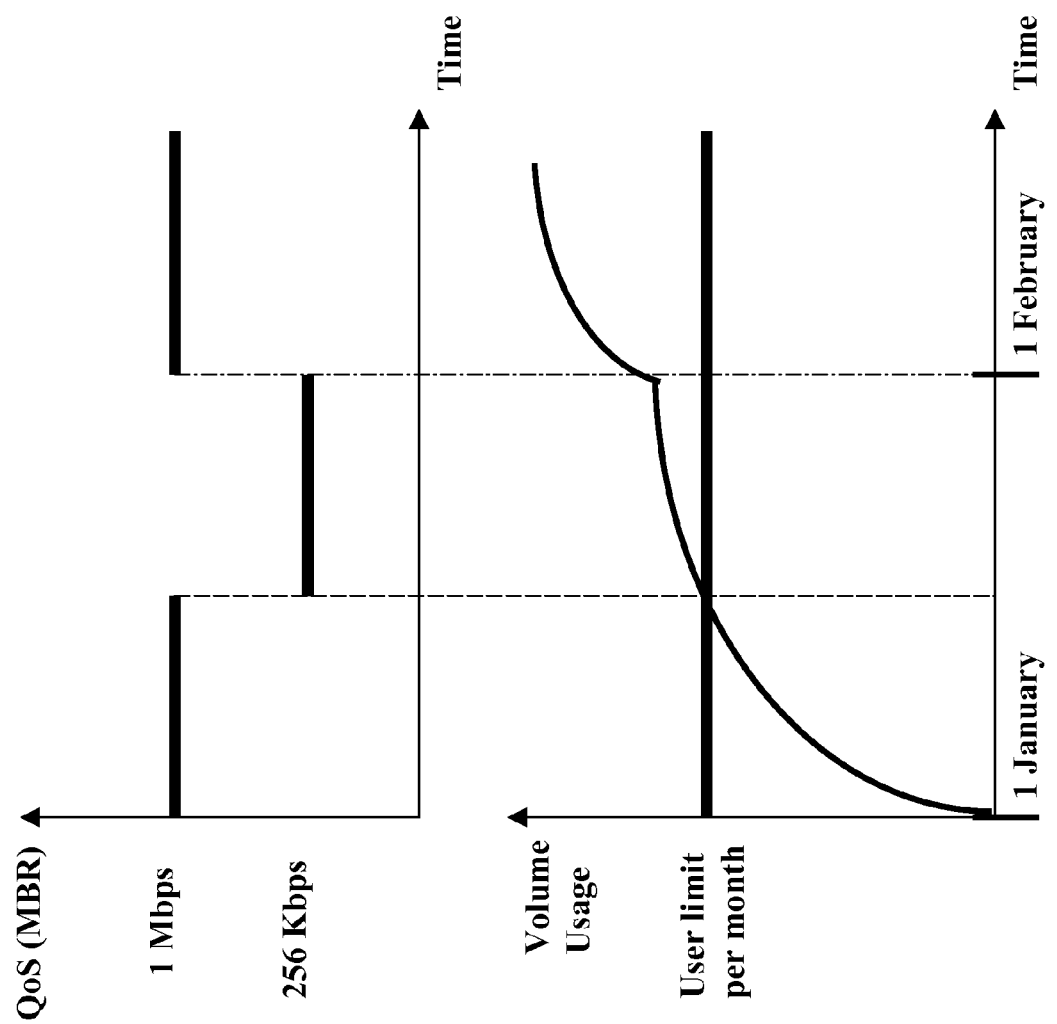
FIG. -5-

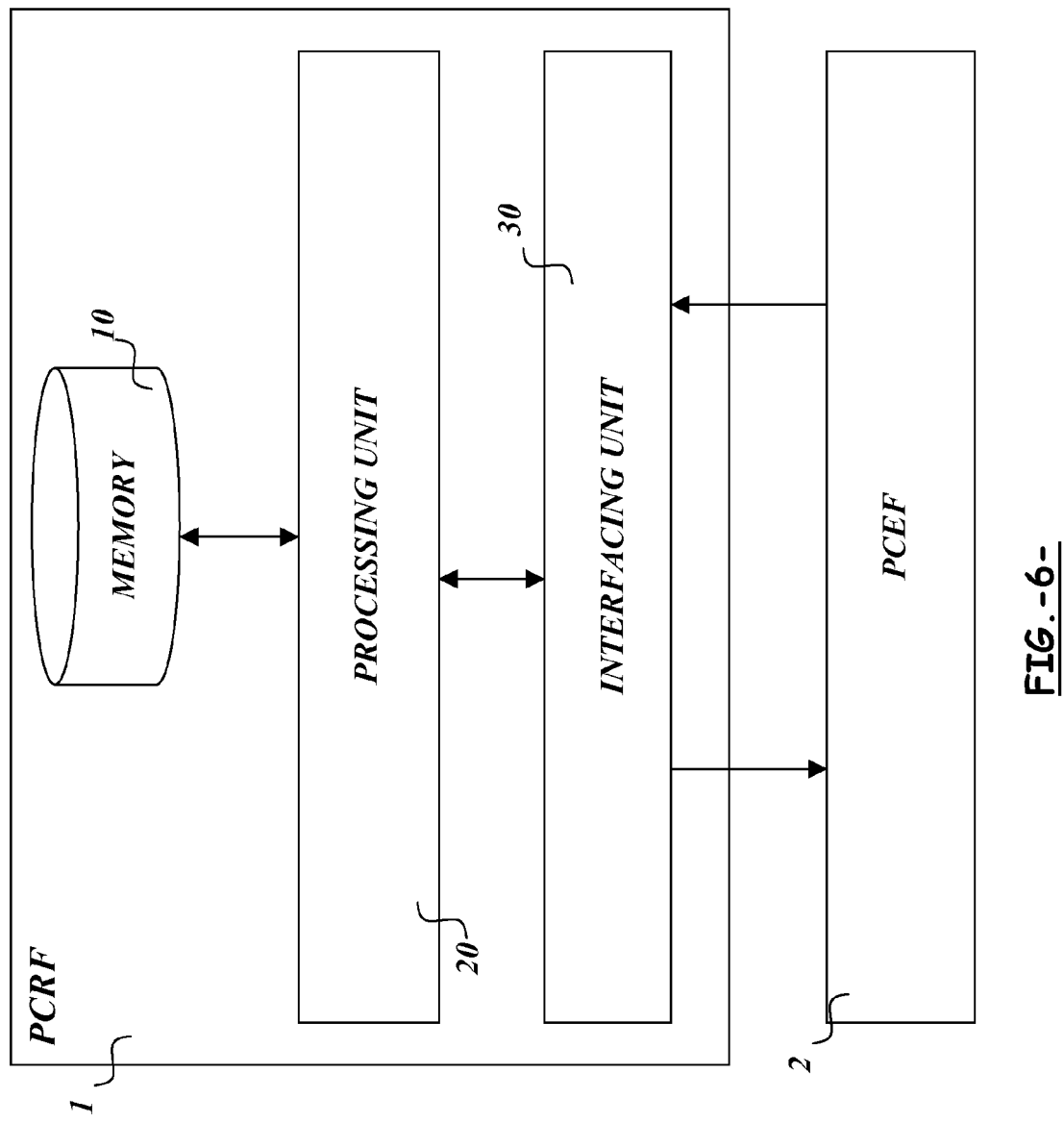
FIG. -6-

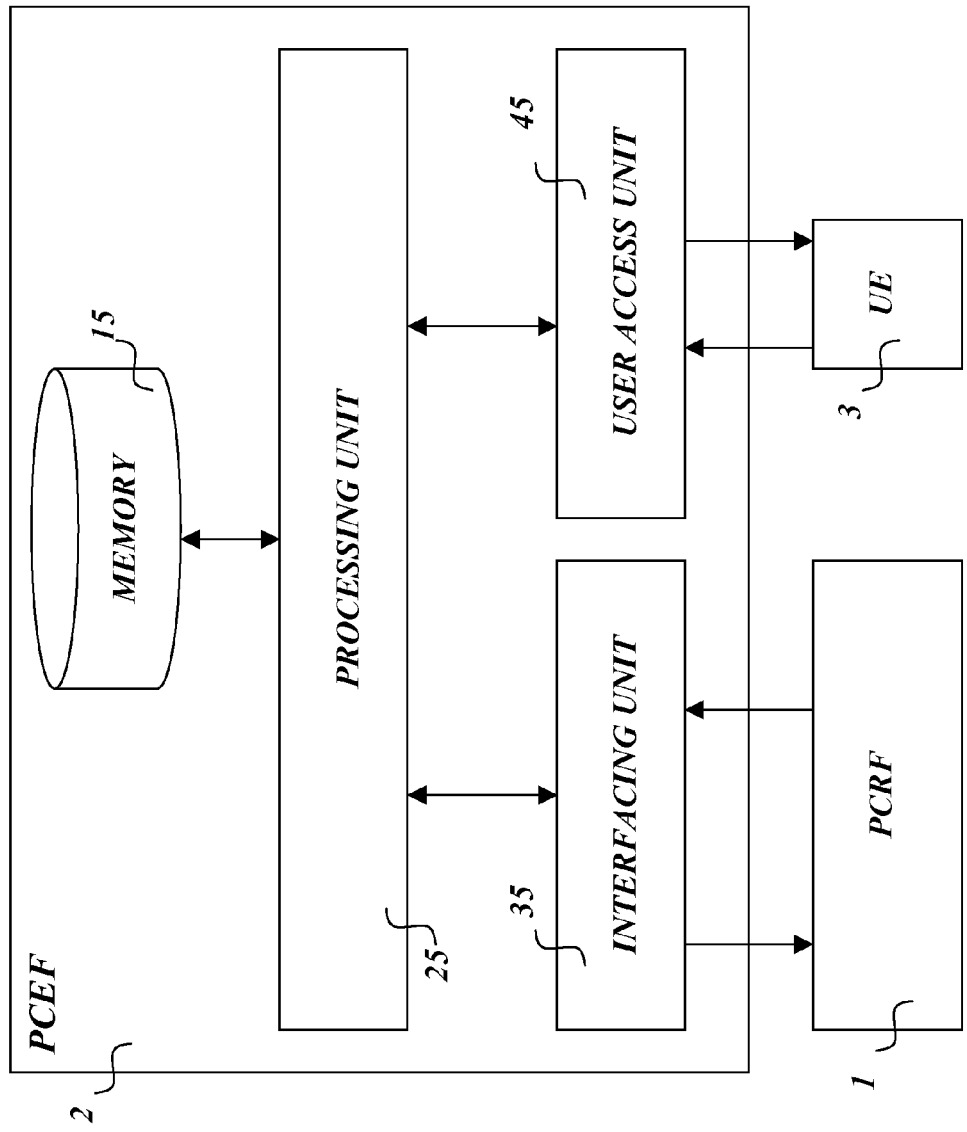
FIG. -7-

METHOD AND APPARATUSES FOR POLICY DECISIONS ON USAGE MONITORING

This application is the U.S. national phase of International Application No. PCT/IB2010/001999 filed 26 Jul. 2010 which designated the U.S. the entire contents of which is hereby incorporated by reference.

TECHNICAL FIELD

The present invention relates to usage reporting in a Policy and Charging Control architecture. More specifically, the present invention pertains to enhancement of related mechanisms to deal with new reporting periods.

BACKGROUND

Current 3GPP standards include functionality to apply usage monitoring for accumulated usage of network resources per IP Connectivity Access Network (IP-CAN) session, per user or per service basis. In particular, the usage monitoring is carried out by a Policy and Charging Control (PCC) architecture including a Policy and Charging Enforcement Function (PCEF) in charge of traffic flow detection and enforcement of applicable policies to user traffic flows; and including a Policy and Charging Rules Function (PCRF) in charge of providing network control for the traffic flow detection by holding policies and providing PCC rules to the PCEF per user traffic flow basis for enforcement of such policies. Moreover, the usage monitoring is thus applicable for service data flows associated with both predefined PCC rules and dynamic PCC rules.

At present, the usage monitoring function is used to control the usage of network resources by subscribers during a period of time, for instance, in order to control a certain amount of volume usage per period of time. This period of time is generally known as reporting period and set to one month.

In particular, the usage monitoring function is applicable for an individual service data flow, a group of services data flows, or for all traffic of an IP-CAN session. Usage monitoring function is thus applicable for service data flows associated with both predefined PCC rules and dynamic PCC rules.

Conventionally, the PCRF is enabled to obtain information about the usage per user at the end of the reporting period and to provide new usage limits allowed for a new reporting period of time.

To this end, the PCRF makes dynamic policy decisions for usage monitoring and sends applicable volume thresholds to the PCEF for monitoring, whereas the PCEF notifies the PCRF when a threshold is reached and reports the accumulated usage since the last report for usage monitoring. The usage monitoring thresholds are traditionally based on volume. Then, the PCRF makes new policy decisions based on the accumulated usage when a specific threshold has been surpassed and provides the PCEF with these new policy decisions, for example downgrading the quality of service.

With the current use of the usage monitoring function per reporting period, the end of the reporting periods is generally set at the same time for a large number of subscribers, thus causing a huge signalling peak over the so-called Gx interface between PCRF and PCEF when this occurs.

On the other hand, in a scenario in which the control of usage is done during the reporting period, when the usage reported for a subscriber exceeds a usage limit permitted in the PCRF, the PCRF indicates towards the PCEF a new policy decision that needs to be enforced. This may be a new quality of service profile, the denial to access to certain services, etc.

Then, when the reporting period expires, the PCRF needs to re-evaluate the policy rules and indicate to the PCEF the new policy decision that needs to be enforced.

As exemplary shown in FIG. 5 for a subscriber, the subscriber has a volume limit for the month, which in the example is surpassed before the end of January; the policy decision taken by the PCRF is to downgrade the quality of service to 256 Kbps (previously to the surpassed limit, the Maximum bit rate was 1 Mbps). When the end of the period is reached and a new reporting period begins the usage counters need to be reset and the policy decision needs to be re-established.

A conventional solution nowadays requires that the PCRF sends a message to the PCEF, when the end of the reporting period is reached, in order to request the accumulated usage and to provide a new policy decision. Since the end of the reporting period is the same for a huge amount of subscribers, this conventional solution has the problem mentioned before of signalling storms at the end of the reporting period for a large number of subscribers.

SUMMARY

The present invention is aimed to at least minimize the above drawback and provides for a method of controlling usage of network resources with an enhanced PCRF and an enhanced PCEF operating in accordance with PCC architecture.

In accordance with a first aspect of the present invention, there is provided a new method of controlling usage of network resources with a PCRF, which is in charge of providing control rules and usage limits for usage of network resources by users during a reporting period of time, and with a PCEF, which is in charge of enforcing the control rules and monitoring the usage of network resources per user during the reporting period.

This method comprises the steps of: determining at the PCEF an event for which control rules are required for one or more user traffic flows of a user; requesting control rules from the PCEF to the PCRF, the request including information about usage of network resources by the user during the reporting period; determining at the PCRF first control rules as a result of a first policy evaluation by taking into account the information about usage of network resources by the user; determining at the PCRF second control rules as a result of a second policy evaluation by taking into account an initial value for usage of network resources by the user during a next reporting period; submitting from the PCRF to the PCEF the first and second control rules; enforcing at the PCEF the first control rules received from the PCRF; and upon starting the next reporting period for the user, inactivating the first control rules and enforcing at the PCEF the second control rules received from the PCRF.

The fact of having the second control rules already available at the PCEF before starting the next reporting period, fully allows the monitoring and controlling of usage of network resources without needs for massive interrogation for control rules for a huge amount of subscribers at the start of the next reporting period.

Generally speaking, the event for which control rules are required may be determined from: establishment, modification or termination of an IP-CAN session for the user, change of access network type, roaming to a different network, change of location, usage limit exhausted, and start of a new reporting period.

In order to allow a variable time distribution of reporting periods, so that the reporting periods for many subscribers are not coincident in time, this method may further comprise a step of determining at the PCRF a reset-time for the user, the reset-time indicating the start of the next reporting period for the user, and a step of submitting from the PCRF to the PCEF said reset-time. In particular, this reset-time may be submitted from the PCRF to the PCEF along with the first and second control rules, or separately.

In order to provide an additional flexibility for operators to offer different subscription choices to subscribers in terms of usage volumes, likely through different daily periods, the method may further comprise a step of determining at the PCRF a new usage limit for usage of network resources by the user, and a step of submitting from the PCRF to the PCEF said new usage limit. Particularly advantageous for operators or users deciding in advance about usage limits, the method may further comprise a step of determining at the PCRF whether the new usage limit is to be applied during current or next reporting period, and a step of submitting from the PCRF to the PCEF an indication indicating whether the new usage limit is to be applied during the current or the next reporting period. In particular, this indication indicating whether the new usage limit is to be applied during the current or the next reporting period may be submitted from the PCRF to the PCEF along with the new usage limit for the user, or separately. Moreover, the new usage limit may be submitted from the PCRF to the PCEF along with, or separately from, the first and second control rules.

Since the information about usage of network resources submitted from the PCEF to the PCRF may adopt different values between the establishment and termination of an IP-CAN session, the information about usage of network resources submitted from the PCEF to the PCRF upon establishment of an IP-CAN session by the user with the PCEF generally indicates an initial value, which in particular may indicate a null usage of network resources for said IP-CAN session. However, generally speaking, the information about usage of network resources submitted from the PCEF to the PCRF during a currently established IP-CAN session for the user includes an accumulated usage of network resources reached by the user for said currently established IP-CAN session. In this respect, responsive to receiving the information about usage of network resources at the PCRF, the method may further comprise a step of determining at the PCRF a remaining usage limit for usage of network resources by the user, and a step of submitting from the PCRF to the PCEF said remaining usage limit for the user.

In this respect, upon termination of an IP-CAN session for the user, the method may further comprise a step of notifying such IP-CAN session termination from the PCEF to the PCRF, the notification including as information about usage of network resources the accumulated usage of network resources reached during said IP-CAN session by the user; and at the PCEF, the method further comprises a step of removing first control rules for said IP-CAN session applied during current reporting period and a step of removing second control rules for said IP-CAN session pending for the next reporting period.

On the other hand, as starting a new reporting period and in order to postpone the request for control rules so that the network overload is not penalized during time peaks with a huge amount of requests for control rules, the method may further comprise a step of activating a report timer, upon which expiry the PCEF carries out the step of requesting control rules to the PCRF, and wherein the information about usage of network resources in this request includes the accumulated usage of network resources reached for the IP-CAN session during the previous reporting period and the accumulated usage of network resources reached for the IP-CAN session between the start of the next reporting period and the expiry of the report timer.

Generally speaking, the above method is applied so that the information about usage of network resources is provided from the PCEF to the PCRF for each IP-CAN session established by the user with the PCEF. Nevertheless, the above method may be applied as well so that the information about usage of network resources is provided from the PCEF to the PCRF per traffic flow included in each IP-CAN session established by the user with the PCEF.

In accordance with a second aspect of the present invention, there is provided a new PCRF for providing control rules and usage limits for usage of network resources by users during a reporting period of time.

This PCRF comprises: an interfacing unit arranged for receiving a request for control rules from the PCEF, the request including information about usage of network resources by a user during the reporting period; a memory for storing the information about usage of network resources by the user; a processing unit arranged for determining first control rules as a result of a first policy evaluation by taking into account the information about usage of network resources by the user, and second control rules as a result of a second policy evaluation by taking into account an initial value for usage of network resources by the user during a next reporting period; and wherein the interfacing unit is arranged for submitting to the PCEF the first control rules along with the second control rules.

In order to provide corresponding advantageous steps of the above method, the processing unit of this PCRF may be arranged for determining a reset-time for the user, the reset-time indicating the start of the next reporting period for the user, and the interfacing unit of the PCRF may be arranged for submitting to the PCEF said reset-time along with the first and second control rules.

Also in order to provide corresponding advantageous steps of the above method, the processing unit may be arranged for determining a new usage limit for usage of network resources by the user, and the interfacing unit may be arranged for submitting to the PCEF said new usage limit. Moreover, the processing unit may also be arranged for determining whether the new usage limit is to be applied during current or next reporting period, and the interfacing unit may also be arranged for submitting to the PCEF an indication indicating whether the new usage limit is to be applied during the current or the next reporting period, the indication being submitted along with the new usage limit for the user. In particular, the interfacing unit may be arranged for submitting the new usage limit to the PCEF along with, or separately from, the first and second control rules.

Still in order to provide corresponding advantageous steps of the above method, the interfacing unit may be arranged for receiving, as information about usage of network resources, an accumulated usage of network resources reached by the user for a currently established IP-CAN session, the processing unit may be arranged for determining a remaining usage limit for usage of network resources by the user, the memory may be arranged for storing the remaining usage limit for usage of network resources by the user, and the interfacing unit may be arranged for submitting to the PCEF said remaining usage limit for the user.

In accordance with a third aspect of the present invention, there is provided a new PCEF for enforcing control rules and monitoring usage of network resources per user during reporting periods.

This PCEF comprises: a processing unit arranged for determining an event for which control rules are required for one or more user traffic flows of a user; an interfacing unit arranged for requesting control rules to the PCRF, the request including information about usage of network resources by the user during the reporting period, wherein this interfacing unit is arranged for receiving from the PCRF first and second control rules; a memory unit arranged for storing the second control rules; and wherein the processing unit is arranged for enforcing the first control rules received from the PCRF and, upon starting the next reporting period for the user, the processing unit is arranged for inactivating the first control rules and for enforcing the second control rules stored in the memory unit.

Aligned with the above method, the processing unit of the PCEF may be arranged for determining the event for which control rules are required from: establishment, modification or termination of an IP-CAN session for the user, change of access network type, roaming to a different network, change of location, usage limit exhausted, and start of a new reporting period.

In order to provide corresponding advantageous steps of the above method, the interfacing unit of the PCEF may be arranged for receiving the reset-time from the PCRF and the processing unit may be arranged for starting the next reporting period for the user as indicated by the reset-time. In particular, the interfacing unit may be arranged for receiving the reset-time from the PCRF along with, or separately from, the first and second control rules.

Also in order to provide corresponding advantageous steps of the above method, the interfacing unit of the PCEF may be arranged for receiving from the PCRF a new usage limit along with an indication indicating whether the new usage limit is to be applied during the current or the next reporting period. In particular, this interfacing unit may be arranged for receiving the new usage limit from the PCRF along with, or separately from, the first and second control rules.

Still in order to provide corresponding advantageous steps of the above method, the processing unit of the PCEF may be arranged for determining an accumulated usage of network resources reached by the user for a currently established IP-CAN session, and the interfacing unit may be arranged for submitting said accumulated usage of network resources to the PCRF and for receiving from the PCRF a remaining usage limit for usage of network resources by the user.

Moreover, as starting a new reporting period and in order to postpone the request for control rules so that the network overload is not penalized during time peaks with a huge amount of requests for control rules, the processing unit of the PCEF may be arranged for activating a report timer and, upon expiry of said report timer, this processing unit may be arranged for determining the accumulated usage of network resources reached for the IP-CAN session during the previous reporting period and the accumulated usage of network resources reached for the IP-CAN session between the start of the new reporting period and the expiry of the report timer, and the interfacing unit of the PCEF may also be arranged for requesting control rules to the PCRF and for submitting as information about usage of network resources in this request the accumulated usage of network resources reached for the IP-CAN session during the previous reporting period and the accumulated usage of network resources reached for the IP-CAN session between the start of the new reporting period and the expiry of the report timer.

On the other hand, the invention may be practiced by a computer program, in accordance with a fourth aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 basically illustrates a simplified view of the sequence of actions to be performed to control usage of network resources for a user upon establishment of an IP-CAN session for the user.

FIG. 2 basically illustrates a simplified view of the sequence of actions to be performed to control usage of network resources for a user upon modification of an IP-CAN session previously established for the user.

FIG. 3 shows an exemplary sequence of actions to be performed to control usage of network resources for a user upon expiry of a reporting period for the user.

FIG. 4 shows an exemplary sequence of actions to be performed to control usage of network resources for a user upon termination of an IP-CAN session previously established for the user.

FIG. 5 shows an exemplary model relating the volume usage limit with the Maximum Bit Rate (MBR) allowed for the subscriber as Quality of Service (QoS).

FIG. 6 illustrates an exemplary implementation of a PCRF provided for in accordance with embodiments of the invention.

FIG. 7 illustrates an exemplary implementation of a PCEF provided for in accordance with embodiments of the invention.

DETAILED DESCRIPTION

The following describes currently preferred embodiments of a PCRF and a PCEF, both operating in accordance with PCC architecture, and a method of controlling usage of network resources with said PCRF and PCEF. In this respect, the PCRF is in charge of providing control rules and usage limits for usage of network resources by users during a reporting period of time, whereas the PCEF is in charge of enforcing the control rules and monitoring the usage of network resources per user during the reporting period.

This method of controlling usage of network resources for a user may be applied at different stages whilst the user has one or more active IP-CAN sessions and even as terminating any of such active IP-CAN sessions. For the sake of simplicity, the terms 'user', 'user equipment', 'user side', 'user with user equipment' and its abbreviation UE may be used throughout this description with a same purpose and functionality unless otherwise provided.

To this end, the method includes a step of determining at the PCEF an event for which control rules are required for one or more user traffic flows of a user, wherein this event may be determined from: establishment, modification or termination of an IP-CAN session for the user, change of access network type, roaming to a different network, change of location, usage limit exhausted, and start of a new reporting period.

This step of determining at the PCEF an event for which control rules are required is not particularly shown in any drawing; however, the method is disclosed in the following, and illustrated in accompanying figures, with reference to different exemplary events such IP-CAN establishment, IP-CAN modification required by a roaming user, start and expiry of reporting periods and termination of the IP-CAN session. Those skilled in the art may encounter other exemplary events where the main teaching of this disclosure can be applied as well.

For instance, FIG. 1 illustrates a sequence of actions to be performed to control usage of network resources for a user upon establishment of an IP-CAN session for the user.

As illustrated in FIG. 1, a reporting period starts during a step S-100 at the PCRF 1, and a user, or UE, 3 initiates the establishment of an IP-CAN session with the PCEF 2 during a step S-105. In particular, where the user accesses a GPRS network, the establishment of the IP-CAN session corresponds to a 'PDP Context Activation' message which is sufficiently known by those skilled in the art of GPRS features.

As already commented above, the PCEF determines that the establishment of an IP-CAN session is an event for which control rules are required. Then, the PCEF requests during a step S-110 control rules to the PCRF. This request, such as a CCR message of a Gx interface may do, generally includes in accordance with the invention information about usage of network resources by the user during the reporting period. In particular, the information about usage of network resources submitted from the PCEF to the PCRF during this step S-110 of initiating the establishment of the IP-CAN session indicates a null usage of network resources for said IP-CAN session. This indication may be implicit to an indication of being an initial request.

The PCRF receiving such request for control rules determines during a step S-115 first control rules as a result of a first policy evaluation carried out by taking into account the information received from the PCEF about usage of network resources by the user. Then, the PCRF also determines during a step S-120 second control rules as a result of a second policy evaluation carried out by taking into account an initial value for usage of network resources by the user during a next reporting period. In one embodiment of the invention, this initial value may be taken by considering a null accumulated usage of network resources as starting said next reporting period; however, in other embodiment of the invention, this initial value may be set to a minimum accumulated usage of network resources per subscriber basis if the network operator assumes a different idle load for different subscribers.

That is, the PCRF determines at this early stage, and in due account of the information about usage of network resources by the user received from the PCEF, those control rules, namely the second control rules, that will be applied during the next reporting period, as well as an initial value for usage of network resources by the user during a next reporting period. For example, the PCRF may determine that the initial value for usage of network resources by the user during the next reporting period could be a null accumulated usage of network resources.

Once first and second control rules are determined, the PCRF submits to the PCEF during a step S-125 the first and second control rules. This submission may be an answer to the previous request for control rules, such as a CCA message of a Gx interface may be, and this submission may particularly include some new information related to usage monitoring as well as some indication of one or more actions to be taken by the PCEF for usage monitoring. For example, where the start and end of reporting periods is fully handled from the PCRF, the PCRF can include in this submission, or being separately submitted, indications to set the reporting periods at the PCEF, new usage limit and the initial value, amongst others.

Upon receipt of first and second control rules at the PCEF, the PCEF may set during a step S-130 the current and any further reporting period indicated by the PCRF, if thus submitted. Then, the PCEF enforces during a step S-135 the first control rules received from the PCRF for the indicated IP-CAN session. This enforcement may be carried out immediately or at a given time short enough to not going beyond the start of the next reporting period.

On the other hand, the PCEF stores during a step S-140 the second control rules also received from the PCRF along with the first control rules. These second control rules are thus already available at the PCEF for the start of the next reporting period without needs for massive interrogation for control rules for a huge amount of subscribers at the start of the next reporting period.

Upon expiry of the current reporting period during a step S-145, and thus starting the new reporting period, the PCEF inactivates the first control rules and enforces during a step S-150 the second control rules previously received from the PCRF and stored at the PCEF. In addition, the PCEF stores the accumulated usage until the expiry of the previous reporting period, which is to be further notified to the PCRF, and resets the accumulated usage of network resources for the IP-CAN session to the initial value as starting this new reporting period.

In order to carry out this method of controlling usage of network resources, there is provided in accordance with the invention a PCRF 1 for providing control rules and usage limits for usage of network resources by users during a reporting period of time, and a PCEF 2 for enforcing the control rules and monitoring usage of network resources per user during reporting periods.

As illustrated in FIG. 6, this PCRF 1 comprises: an interfacing unit 30 arranged for receiving a request for control rules from the PCEF 2, the request including information about usage of network resources by a user during the reporting period; a memory 10 for storing the information about usage of network resources by the user; a processing unit 20 arranged for determining first control rules as a result of a first policy evaluation by taking into account the information about usage of network resources by the user, which is received from the PCEF, and second control rules as a result of a second policy evaluation by taking into account an initial value for usage of network resources by the user during a next reporting period; and wherein the interfacing unit 30 is arranged for submitting to the PCEF 2 the first control rules along with the second control rules.

As illustrated in FIG. 7, this PCEF 2 comprises: a user access unit 45 arranged for communicating with the UE 3; a processing unit 25 arranged for determining an event for which control rules are required for one or more user traffic flows of a user; an interfacing unit 35 arranged for requesting control rules to a PCRF 1, the request including information about usage of network resources by the user during the reporting period, wherein this interfacing unit 35 is arranged for receiving from the PCRF first and second control rules; a memory unit 15 arranged for storing the second control rules; and wherein the processing unit 25 is arranged for enforcing the first control rules received from the PCRF and, upon starting the next reporting period for the user, the processing unit is arranged for inactivating the first control rules and for enforcing the second control rules stored in the memory unit 15.

As already commented above, different events can be determined at the PCEF for which control rules are required. To this end, the processing unit 25 of the PCEF 2 may be arranged for determining the event for which control rules are required from: establishment, modification or termination of an IP-CAN session for the user, change of access network type, roaming to a different network, change of location, usage limit exhausted, start of a new reporting period, and others.

Another of such events is the modification of an IP-CAN session already established for a user. FIG. 2 illustrates a sequence of actions to be performed to control usage of network resources for a user upon modification of an IP-CAN session for the user, for example, when the user is roaming. This scenario may well occur as a continuation of the situation disclosed with reference to FIG. 1, as illustrated in the drawings with time line connectors, or at any time after having established an IP-CAN session for the user.

As illustrated in FIG. 2, the UE 3 submits during a step S-155 an IP-CAN session update request, which may explicitly indicate the roaming condition, towards the PCEF. The PCEF determines that the IP-CAN session update, namely a modification of an IP-CAN session, is an event for which control rules are required. Then, the PCEF requests during a step S-160 control rules to the PCRF. This update request, such as the CCR message of the Gx interface commented above may do, generally includes in accordance with the invention information about usage of network resources by the user during the reporting period. In particular, the information about usage of network resources, submitted from the PCEF to the PCRF during this step S-160 of modifying the currently established IP-CAN session, includes an accumulated usage of network resources reached by the user for the currently established IP-CAN session.

At any time whilst this method of controlling usage of network resources is carried out, and particularly relevant where an accumulated usage of network resources reached by a user is reported from the PCEF to the PCRF, in an embodiment of the invention the PCRF may determine during a step S-165 a reset-time for the user, wherein this reset-time indicates the start of the next reporting period for the user. Alternatively or complementary to the reset-time, in an embodiment of the invention the PCRF may determine during a step S-170 a new usage limit for usage of network resources by the user. In particular, the PCRF may also determine whether said new usage limit is to be applied during current or next reporting period.

To this end, the processing unit 25 of the PCEF 2, as illustrated in FIG. 7, may be arranged for determining an accumulated usage of network resources reached by the user for the currently established IP-CAN session, whereas the interfacing unit 35 of the PCEF 2 may be arranged for submitting said accumulated usage of network resources to the PCRF 1.

Also to this end, the interfacing unit 30 of the PCRF 1, as illustrated in FIG. 6, may be arranged for receiving, as information about usage of network resources, an accumulated usage of network resources reached by the user for a currently established IP-CAN session; the processing unit 20 of the PCRF 1 may be arranged for determining a reset-time for the user, the reset-time indicating the start of the next reporting period for the user; and the processing unit 20 may also be arranged for determining a new usage limit for usage of network resources by the user as well as for determining whether the new usage limit is to be applied during current or next reporting period.

In an embodiment of the invention the PCEF is responsible for taking appropriate actions where the current usage of network resources surpasses a currently applicable usage limit and thus takes due account of the remaining usage limit for usage of network resources by each user. In another embodiment, however, the PCRF takes an active part in this account. To this end, responsive to receiving the information about usage of network resources, the PCRF may determine during the step S-170 a remaining usage limit for usage of network resources by the user.

To this end, the processing unit 20 of the PCRF 1, as illustrated in FIG. 6, may be arranged for determining the remaining usage limit for usage of network resources by the user, whereas the memory 10 may be arranged for storing the remaining usage limit for usage of network resources by the user.

Likewise the previous event discussed above with reference to FIG. 1, also where the event is the IP-CAN session update request currently discussed with reference to FIG. 2, the PCRF determines during a step S-175 first control rules as a result of a first policy evaluation carried out by taking into account the information received from the PCEF about usage of network resources by the user; and the PCRF also determines during a step S-180 second control rules as a result of a second policy evaluation carried out by taking into account an initial value for usage of network resources by the user during a next reporting period. As already commented above, in one embodiment of the invention, this initial value may be taken by considering a null accumulated usage of network resources as starting said next reporting period; whereas, in other embodiment of the invention, this initial value may be set to a minimum accumulated usage of network resources per subscriber basis if the network operator assumes a different idle load for different subscribers. In particular, this initial value may also be set by taking into account the new usage limit for usage of network resources by the user, if any, as determined during the step S-170, especially where said new usage limit is determined to apply for the next reporting period.

Then, the PCRF submits to the PCEF during a step S-185 the first control rules and the second control rules. As commented above for the event of establishing the IP-CAN session, this submission may be an answer to the previous request for control rules, such as a CCA message of a Gx interface may be. Moreover, where a reset-time has been determined, the PCRF also submits said reset-time to the PCEF and, where a new usage limit has been determined, the PCRF also submits said new usage limit to the PCEF. Furthermore, where a new usage limit has been determined and whether the new usage limit is to be applied during the current or the next reporting period, the PCRF also submits to the PCEF an indication indicating whether the new usage limit is to be applied during the current or the next reporting period.

To this end, the interfacing unit 30 of the PCRF 1 may be arranged for submitting to the PCEF 2 the reset-time along with, or separately from, the first and second control rules. Moreover, the interfacing unit 30 may be arranged for submitting to the PCEF 2 the new usage limit as well as the indication indicating whether the new usage limit is to be applied during the current or the next reporting period. In particular this indication may be submitted by the interfacing unit 30 along with, or separately from, the new usage limit for the user. More particularly, the interfacing unit 30 of the PCRF 1 may be arranged for submitting the new usage limit to the PCEF 2 along with the first and second control rules.

In particular, both reset-time and new usage limit with the indication indicating whether the new usage limit is to be applied during the current or the next reporting period may be submitted from the PCRF to the PCEF separately from each other or along with the first and second control rules during the step S-185. In this respect, both reset-time and new usage limit are stored at the PCEF for further use, as well as the time when the latter is to be applied. Moreover, the initial value for usage of network resources by the user during a next reporting period may be submitted from the PCRF to the PCEF, especially where such initial value is given a value different than null, and stored at the PCEF.

Also in particular, where the PCRF is in charge of determining a remaining usage limit for usage of network resources by the user, the PCRF submits to the PCEF said remaining usage limit for usage of network resources by the user applicable during the current reporting period. As for the above embodiments of submitting any of the reset-time, the new usage limit and the initial value, this remaining usage limit for usage of network resources by the user may be submitted from the PCRF to the PCEF separately or along with the first and second control rules during the step S-185.

To this end, the interfacing unit 30 of the PCRF 1 may be arranged for submitting to the PCEF 2 said remaining usage limit for the user. In particular, the interfacing unit 30 may be arranged for submitting to the PCEF 2 said remaining usage limit for the user along with, or separate from, the first and second control rules.

Back to the sequence of actions in FIG. 2, where a reset-time is received at the PCEF from the PCRF, the PCEF updates during a step S-190 the reporting period with the reset-time. Where a new usage limit is received at the PCEF from the PCRF, the PCEF determines during a step S-195 by when the new usage limit applies, and may also determine whether the accumulated usage surpasses or not the new usage limit. In particular, where the remaining usage limit for usage of network resources by the user has been received at the PCEF from the PCRF, this remaining usage is used by the PCEF in determining whether or not the accumulated usage surpasses the remaining usage limit. In principle, new usage limit and remaining usage are not exclusive to each other. The remaining usage applies immediately and in respect of the currently applicable usage limit, being the currently applicable usage limit the one previously applicable or the new usage limit, if any. For example, let us figure out the current usage limit had been set to 10 units (in terms of e.g. volume), and the PCRF has submitted to the PCEF a remaining usage of 3 units, which indicates the accumulated usage previously reported from the PCEF to the PCRF was 7 units. If the PCRF also submits a new usage limit of 7 units to be applied after 1 hour, the PCEF determines that the user can still make use of the 3 units of remaining usage during this 1 hour. However, if the PCRF submits the new usage limit of 7 units to be immediately applied, the PCEF determines that the user has reached the overall usage limit. Nevertheless, other arrangements are possible, where both remaining usage and new usage limit are not necessary. For instance, where the remaining usage is always determined by the PCEF on its own, even if the PCRF also determines such remaining usage, there is no need for its submission from the PCRF. Also for example, the new usage limit, where indicated to be immediately applied, may be used for the same purpose as the remaining usage so that the submission of both may be redundant.

As a further example, where setting appropriate values and depending on configuration options, different embodiments may turn up wherein both remaining usage and new usage limit to be immediately applied can make sense. For example, where the current usage limit had been set to 10 units and the PCRF submits to the PCEF a remaining usage of 5 units and a new usage limit of 7 units to be immediately applied, the PCEF may be configured in one embodiment to determine that the user still has the remaining usage of 5 units out of the 7 units of new usage limit, whereas in other embodiment the user has spent 5 units (difference between the original usage limit of 10 units and the remaining usage of 5 units) out of the new usage limit of 7 units.

To this end, the interfacing unit 35 of the PCEF 2 may be arranged for receiving the reset-time from the PCRF 1 and the processing unit 25 may be arranged for starting the next reporting period for the user as indicated by the reset-time. In particular, the interfacing unit 35 may be arranged for receiving the reset-time from the PCRF 1 along with, or separately from, the first and second control rules.

Apart from that, the interfacing unit 35 of the PCEF 2 may be arranged for receiving from the PCRF 1 the new usage limit along with an indication indicating whether the new usage limit is to be applied during the current or the next reporting period, and the processing unit 25 may be arranged for determining when the new usage limit applies, as well as for determining whether the accumulated usage surpasses or not the new usage limit. In particular, the interfacing unit 35 may be arranged for receiving the new usage limit from the PCRF 1 along with, or separately from, the first and second control rules.

Moreover, the interfacing unit 35 of the PCEF 2 may be arranged for receiving from the PCRF 1 the remaining usage limit for usage of network resources by the user, and the processing unit 25 may be arranged for determining whether or not the accumulated usage surpasses the remaining usage limit.

Back to the sequence of actions illustrated in FIG. 2, and after having carried out the possible actions discussed above in respect of steps S-190 and S-195, if any, the PCEF enforces during a step S-200 the first control rules received from the PCRF for the updated IP-CAN session. As for the previous event discussed with reference to FIG. 1, this enforcement may be carried out immediately or at a given time short enough to not going beyond the start of the next reporting period. Then, the PCEF stores during a step S-210 the second control rules also received from the PCRF along with the first control rules. As for the previous event discussed with reference to FIG. 1, these second control rules are thus already available at the PCEF for the start of the next reporting period without needs for massive interrogation for control rules for a huge amount of subscribers as starting the next reporting period.

Following with the detection at the PCEF of events for which control rules are required, FIG. 3 illustrates a sequence of actions to be performed to control usage of network resources for a user when a reporting period expires and a new reporting period starts. Even though the expiry of a reporting period has been commented above in respect of the event illustrated in FIG. 1, there are more objects of discussion which may be better explained after having reported any accumulated usage for any IP-CAN session or traffic flows therein, such as the situation commented above with reference to FIG. 2.

FIG. 3 may thus be followed as a continuation of the sequence of actions explained with reference to FIG. 2, though it may well follow other events not illustrated in any drawing and following the inventive concepts of the invention.

As shown in FIG. 3, the expiry of a reporting period during a step S-210 starts a next reporting period. In principle, the expiry of a reporting period may be primary detected at the PCRF and immediately communicated from the PCRF to the PCEF, or the common expiry of a reporting period may separately be determined by both PCEF and PCRF.

Upon starting the new reporting period for the user during the step S-210, the PCEF inactivates the first control rules and enforces during a step S-215 the second control rules previously received from the PCRF and stored at the PCEF. In addition, the PCEF stores the accumulated usage until the expiry of the previous reporting period, which is to be further notified to the PCRF, and resets the accumulated usage of network resources for the IP-CAN session to the initial value as starting this new reporting period.

Apart from that, if a new usage limit had been determined by the PCRF, as the one commented above during the step S-170, and particularly in the case where such new usage limit was indicated to apply at the start of the next reporting period, the PCEF may apply during a step S-220 such new usage limit, which indication had been stored at the PCEF, for this new reporting period started during the step S-210.

Even though the start of a new reporting period is an event for which control rules are required, the enforcement of these second control rules previously received from the PCRF and stored in the PCEF takes the place of the new control rules and thus saves the network overload produced by massive requests for new control rules for a huge amount of subscribers. However, in order to maintain the general teaching of the invention, there is still a need for requesting at least new control rules applicable for the next reporting period and to be stored at the PCEF, as for the other events discussed above, namely those referred to as second control rules. Nevertheless, such new request for control rules required upon start of the new reporting period may be postponed and graded so that the network performance and overload is not significantly penalized during certain time peaks.

To this end, once the second control rules, which were stored at the PCEF, are enforced during the step S-215 upon start of the new reporting period, the PCEF may activate during a step S-225 a so-called report timer to delay the request for new control rules. Upon expiry of this report timer during the step S-230, the PCEF requests during a step S-235 control rules to the PCRF, request that may be carried out with the CCR message of the Gx interface as for other events commented above, and which generally includes in accordance with the invention information about usage of network resources. Apart from the information about usage of network resources, this request for new control rules also indicates the expiry of the reset-time, that is, the start of the new reporting period.

Particularly in this case, that is, where the request is submitted upon expiry of the report timer, the information about usage of network resources in this request includes the accumulated usage of network resources reached for the IP-CAN session during the previous reporting period and the accumulated usage of network resources reached for the IP-CAN session between the start of the new reporting period occurring during the step S-210 and the expiry of the report timer occurring during the step S-230.

To this end, the processing unit 25 of the PCEF 2 may be arranged for activating a report timer upon start of a new reporting period; and, upon expiry of said report timer, the processing unit 25 may be arranged for determining the accumulated usage of network resources reached for the IP-CAN session during the previous reporting period and the accumulated usage of network resources reached for the IP-CAN session between the start of the new reporting period and the expiry of the report timer; and wherein the interfacing unit 35 may be arranged for requesting control rules to the PCRF and for submitting as information about usage of network resources in this request the accumulated usage of network resources reached for the IP-CAN session during the previous reporting period and the accumulated usage of network resources reached for the IP-CAN session between the start of the new reporting period and the expiry of the report timer.

Back to the sequence of actions illustrated in FIG. 3, the PCRF may determine during a step S-240 a new usage limit for usage of network resources by the user; and, in particular, the PCRF may also determine whether said new usage limit is to be applied during current or next reporting period. In addition, the PCRF may also determine during this step S-240 a remaining usage for the IP-CAN session. These determinations of new usage limit and remaining usage are made by taking into account the accumulated usage of network resources reached for the IP-CAN session as reported from the PCEF.

As commented above for other events, also in this case the PCRF could determine a new reset-time to be applied. This has been omitted from the drawing for the sake of simplicity. In any case, the PCRF may determine a new reset-time for any user in order to further separate in time those requests for control rules for the amount of subscribers. On way to do this is by changing the reset-time for some subscribers until reaching an optimal time distribution of requests.

Regarding the new rules requested, since the PCRF has received such request during the step S-235 indicating the expiry of the reset-time, the PCRF may determine that new first control rules to be enforced during the current reporting period are not necessary but only new second control rules to be enforced during the next reporting period.

If this were the case, the PCRF may determine during a step S-245 second control rules as a result of a second policy evaluation carried out by taking into account an initial value for usage of network resources by the user during a next reporting period. As already commented above, in one embodiment of the invention, this initial value may be taken by considering a null accumulated usage of network resources as starting said next reporting period; whereas, in other embodiment of the invention, this initial value may be set to a minimum accumulated usage of network resources per subscriber basis if the network operator assumes a different idle load for different subscribers. In particular, this initial value may also be set by taking into account the new usage limit for usage of network resources by the user as determined during the step S-240, especially where said new usage limit is determined to apply for the next reporting period. Although this initial value may be determined by taking into account other parameters received at the PCRF from the operator by provisioning means, for example.

Otherwise, nothing prevents from also determining at the PCRF new first control rules to be enforced during the current reporting period at a time determinable by the PCRF, as for other events commented above.

Then, the PCRF submits to the PCEF during a step S-250 the new second control rules to be applied during the next reporting period and, if new first control rules have also been determined, said new first control rules to be applied during the current reporting period. As commented above for other events, this submission may be an answer to the previous request for control rules, such as a CCA message of a Gx interface may be. Moreover, where a new usage limit has been determined and whether the new usage limit is to be applied during the current or the next reporting period, the PCRF submits to the PCEF said new usage limit along with an indication indicating whether the new usage limit is to be applied during the current or the next reporting period. Furthermore, where a new reset-time, a new initial value, or both have been determined, what is not illustrated in FIG. 3, the PCRF also submits said new reset-time, new initial value or both to the PCEF.

The sequence of actions following this submission, which are omitted in FIG. 3 for the sake of simplicity, may be similar to those already discussed above for other events, such as storing at the PCEF the new second control rules to be applied during the next reporting period, enforcing the new first control rules if received, updating the current usage limit if a new usage limit is received to be immediately applied, and storing any further information such as a new reset-time, a new initial value, or a new usage limit to be further applied along with an indication of the time when the new usage limit is to be applied.

Further following with the detection at the PCEF of events for which control rules are required, FIG. 4 illustrates a sequence of actions to be performed to control usage of network resources for a user upon termination of an IP-CAN session for the user.

FIG. 4 may thus be followed as a continuation of the sequence of actions explained with reference to FIG. 2, though it may well continue the sequence of actions illustrated in FIG. 1 or in FIG. 3, as well as corresponding actions for other events not illustrated in any drawing and following the inventive concepts of the invention.

As shown in FIG. 4, the UE 3 submits during a step S-300 an IP-CAN session termination towards the PCEF. In particular, where the user accesses through a GPRS network, the IP-CAN session termination corresponds to a 'PDP Context Deactivation' message, which is sufficiently known by those skilled in the art of GPRS features.

Then, the PCEF removes during a step S-305 the first control rules for said IP-CAN session applied during current reporting period and also removes during a step S-310 the second control rules for said IP-CAN session pending for the next reporting period. Prior, in parallel, or after removal of the first and second control rules at the PCEF, the PCEF notifies during a step S-315 to the PCRF such IP-CAN session termination, the notification including as information about usage of network resources the accumulated usage of network resources reached during said IP-CAN session by the user. In particular, this notification may also be carried out with the CCR message of the Gx interface as for other events commented above.

Upon receipt of the IP-CAN session termination, the PCRF determines during a step S-320 the total accumulated usage of network resources for this IP-CAN session by the user, and stores during a step S-325 this total accumulated usage of network resources along with any other relevant usage information that the PCRF had been configured to keep for statistical purposes or, more particularly, for an overall usage reporting and control taking into account more than one IP-CAN session during the reporting period.

In this respect, in one embodiment of the invention in accordance with the above discussion, the usage reporting and control is handled per IP-CAN session basis. That is, the information about usage of network resources is provided from the PCEF to the PCRF for each IP-CAN session established by the user with the PCEF.

In another, the usage reporting and control is handled per traffic flow included in each IP-CAN session. That is, the information about usage of network resources is provided from the PCEF to the PCRF per traffic flow included in each IP-CAN session established by the user with the PCEF.

The invention may also be practiced by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of controlling usage of network resources with a Policy and Charging Rules Function server "PCRF", which is in charge of providing control rules and usage limits for usage of network resources by users during a plurality of reporting periods of time, and with a Policy and Charging Enforcement Function server "PCEF", which is in charge of enforcing the control rules and monitoring the usage of network resources per user during the plurality of reporting periods, the method comprising the steps of:

determining at the PCEF an event during a first reporting period for which control rules are required for one or more user traffic flows of a user;

requesting control rules from the PCEF to the PCRF, the request including information about usage of network resources by the user during the first reporting period;

determining at the PCRF first control rules as a result of a first policy evaluation by taking into account the information about usage of network resources by the user during the first reporting period;

determining at the PCRF second control rules as a result of a second policy evaluation by taking into account an initial value for usage of network resources by the user during a second reporting period following the first reporting period;

submitting from the PCRF to the PCEF the first and second control rules;

enforcing at the PCEF the first control rules received from the PCRF during the first reporting period; and without interrogating the PCRF and upon starting the second reporting period for the user, inactivating the first control rules and enforcing at the PCEF the second control rules received from the PCRF.

2. The method of claim 1, further comprising a step of determining at the PCRF a reset-time for the user, the reset-time indicating the start of the second reporting period for the user, and a step of submitting from the PCRF to the PCEF said reset-time.

3. The method of claim 2, wherein the reset-time is submitted from the PCRF to the PCEF along with the first and second control rules.

4. The method of claim 1, further comprising a step of determining at the PCRF a new usage limit for usage of network resources by the user, and a step of submitting from the PCRF to the PCEF said new usage limit.

5. The method of claim 4, further comprising a step of determining at the PCRF whether the new usage limit is to be applied during the first or second reporting period, and a step of submitting from the PCRF to the PCEF an indication indicating whether the new usage limit is to be applied during the first or second reporting period.

6. The method of claim 4, wherein the new usage limit is submitted from the PCRF to the PCEF along with the first and second control rules.

7. The method of claim 5, wherein the indication indicating whether the new usage limit is to be applied during the current or the next reporting period is submitted from the PCRF to the PCEF along with the new usage limit for the user.

8. The method of claim 1, wherein the information about usage of network resources submitted from the PCEF to the PCRF upon establishment of an IP Connectivity Access Network "IP-CAN" session by the user with the PCEF indicates a null usage of network resources for said IP-CAN session.

9. The method of claim 1, wherein the information about usage of network resources submitted from the PCEF to the PCRF during a currently established IP-CAN session for the user includes an accumulated usage of network resources reached by the user for said currently established IP-CAN session.

10. The method of claim 9, wherein responsive to receiving the information about usage of network resources at the PCRF, the method further comprises a step of determining at the PCRF a remaining usage limit for usage of network resources by the user, and a step of submitting from the PCRF to the PCEF said remaining usage limit for the user.

11. The method of claim 9, wherein upon termination of an IP-CAN session for the user, the method further comprises a step of notifying such IP-CAN session termination from the PCEF to the PCRF, the notification including as information about usage of network resources the accumulated usage of network resources reached during said IP-CAN session by the user; and at the PCEF, the method further comprises a step of removing first control rules for said IP-CAN session applied during current reporting period and a step of removing second control rules for said IP-CAN session pending for the second reporting period.

12. The method of claim 1, wherein the event for which control rules are required is determined from: establishment, modification or termination of an IP-CAN session for the user, change of access network type, roaming to a different network, change of location, usage limit exhausted, and start of the second reporting period.

13. The method of claim 12, wherein as starting a new reporting period, the method further comprises a step of activating a report timer, upon which expiry the PCEF carries out the step of requesting control rules to the PCRF, and wherein the information about usage of network resources in this request includes the accumulated usage of network resources reached for the IP-CAN session during the previous reporting period and the accumulated usage of network resources reached for the IP-CAN session between the start of the second reporting period and the expiry of the report timer.

14. The method of claim 1, wherein the information about usage of network resources is provided from the PCEF to the PCRF for each IP-CAN session established by the user with the PCEF.

15. The method of claim 1, wherein the information about usage of network resources is provided from the PCEF to the PCRF per traffic flow included in each IP-CAN session established by the user with the PCEF.

16. A Policy and Charging Rules Function server "PCRF" for providing control rules and usage limits for usage of network resources by users during a plurality of reporting periods of time, the PCRF comprising:
an interfacing unit arranged for receiving a request for control rules from a Policy and Charging Enforcement Function server "PCEF", which is in charge of enforcing the control rules and monitoring the usage of network resources per user during a first reporting period, the request including information about usage of network resources by a user during the first reporting period;
a memory for storing the information about usage of network resources by the user;
a processing unit arranged for determining first control rules as a result of a first policy evaluation by taking into account the information about usage of network resources by the user, and second control rules as a result of a second policy evaluation by taking into account an initial value for usage of network resources by the user during a second reporting period following the first reporting period; and
the interfacing unit arranged for submitting to the PCEF the first control rules for the first reporting period along with the second control rules for the second reporting period.

17. The PCRF of claim 16, wherein the processing unit is arranged for determining a reset-time for the user, the reset-time indicating the start of the second reporting period for the user, and wherein the interfacing unit is arranged for submitting to the PCEF said reset-time along with the first and second control rules.

18. The PCRF of claim 16, wherein the processing unit is arranged for determining a new usage limit for usage of network resources by the user, and wherein the interfacing unit is arranged for submitting to the PCEF said new usage limit.

19. The PCRF of claim 18, wherein the processing unit is arranged for determining whether the new usage limit is to be applied during the first or second reporting period, and wherein the interfacing unit is arranged for submitting to the PCEF an indication indicating whether the new usage limit is to be applied during the first or second reporting period, the indication being submitted along with the new usage limit for the user.

20. The PCRF of claim 18, wherein the interfacing unit is arranged for submitting the new usage limit to the PCEF along with the first and second control rules.

21. The PCRF of claim 16, wherein the interfacing unit is arranged for receiving, as information about usage of network resources, an accumulated usage of network resources reached by the user for a currently established IP-CAN session, the processing unit is arranged for determining a remaining usage limit for usage of network resources by the user, the memory is arranged for storing the remaining usage limit for usage of network resources by the user, and the interfacing unit is arranged for submitting to the PCEF said remaining usage limit for the user.

22. A Policy and Charging Enforcement Function server "PCEF" for enforcing control rules and monitoring usage of network resources per user during a plurality of reporting periods, the PCEF comprising:
a processing unit arranged for determining an event for which control rules are required for one or more user traffic flows of a user;
an interfacing unit arranged for requesting control rules to a Policy and Charging Rules Function server "PCRF", which is in charge of providing control rules and usage limits for usage of network resources by users during a first reporting period, the request including information about usage of network resources by the user during the first reporting period;
the interfacing unit arranged for receiving from the PCRF first and second control rules;
a memory unit arranged for storing the second control rules; and
the processing unit arranged for enforcing the first control rules received from the PCRF during the first reporting period and, upon starting a second reporting period for the user, the processing unit arranged for inactivating the first control rules for the first reporting period and for enforcing the second control rules stored in the memory unit for the second reporting period, the second reporting period following the first reporting period.

23. The PCEF of claim 22, wherein the interfacing unit is arranged for receiving a reset-time from the PCRF and the processing unit is arranged for starting the second reporting period for the user as indicated by the reset-time.

24. The PCEF of claim 23, wherein the interfacing unit is arranged for receiving the reset-time from the PCRF along with the first and second control rules.

25. The PCEF of claim 22, wherein the interfacing unit is arranged for receiving from the PCRF a new usage limit along with an indication indicating whether the new usage limit is to be applied during the first or second reporting period.

26. The PCEF of claim 25, wherein the interfacing unit is arranged for receiving the new usage limit from the PCRF along with the first and second control rules.

27. The PCEF of claim 22, wherein the processing unit is arranged for determining an accumulated usage of network resources reached by the user for a currently established IP-CAN session, and wherein the interfacing unit is arranged for submitting said accumulated usage of network resources to the PCRF and for receiving from the PCRF a remaining usage limit for usage of network resources by the user.

28. The PCEF of claim 22, wherein the processing unit is arranged for determining the event for which control rules are required from: establishment, modification or termination of an IP-CAN session for the user, change of access network type, roaming to a different network, change of location, usage limit exhausted, and start of a new reporting period.

29. The PCEF of claim 28, wherein upon start of a new reporting period the processing unit is arranged for activating a report timer and, upon expiry of said report timer, the processing unit is arranged for determining the accumulated usage of network resources reached for the IP-CAN session during the previous reporting period and the accumulated usage of network resources reached for the IP-CAN session between the start of the new reporting period and the expiry of the report timer, and wherein the interfacing unit is arranged for requesting control rules to the PCRF and for submitting as information about usage of network resources in this request the accumulated usage of network resources reached for the IP-CAN session during the previous reporting period and the accumulated usage of network resources reached for the IP-CAN session between the start of the second reporting period and the expiry of the report timer.

30. A computer program, loadable into an internal memory of a computer with input and output units as well as with a processing unit, the computer program comprising executable code adapted when running in the computer to:
 determine at the PCEF an event during a first reporting period for which control rules are required for one or more user traffic flows of a user;
 request control rules from the PCEF to the PCRF, the request including information about usage of network resources by the user during the first reporting period;
 determine at the PCRF first control rules as a result of a first policy evaluation by taking into account the information about usage of network resources by the user during the first reporting period;
 determine at the PCRF second control rules as a result of a second policy evaluation by taking into account an initial value for usage of network resources by the user during a second reporting period following the first reporting period;
 submit from the PCRF to the PCEF the first and second control rules;
 enforce at the PCEF the first control rules received from the PCRF during the first reporting period; and
 without interrogating the PCRF and upon starting the second reporting period for the user, inactivating the first control rules and enforcing at the PCEF the second control rules received from the PCRF.

31. The computer program of claim 30, wherein the executable code is recorded in a carrier readable in a computer.

* * * * *